United States Patent [19]
Williams

[11] Patent Number: 4,964,033
[45] Date of Patent: Oct. 16, 1990

[54] MICROPROCESSOR CONTROLLED INTERCONNECTION APPARATUS FOR VERY HIGH SPEED INTEGRATED CIRCUITS

[75] Inventor: Paul F. Williams, Burnsville, Minn.

[73] Assignee: Honeywell Inc., Minneapolis, Minn.

[21] Appl. No.: 293,077

[22] Filed: Jan. 3, 1989

[51] Int. Cl.⁵ ............................................. G06F 13/00
[52] U.S. Cl. ................................. 364/200; 364/232.7; 364/232.8; 364/239; 364/239.7
[58] Field of Search ... 364/200 MS File, 900 MS File

[56] References Cited

U.S. PATENT DOCUMENTS

| | | | |
|---|---|---|---|
| 3,921,141 | 11/1975 | Wilber et al. | 364/200 |
| 3,921,142 | 11/1975 | Bryant et al. | 364/200 |
| 4,006,465 | 2/1977 | Cross et al. | 364/200 |
| 4,006,466 | 2/1977 | Patterson et al. | 364/200 |
| 4,091,455 | 5/1978 | Woods et al. | 364/200 |
| 4,124,891 | 11/1978 | Weller, III et al. | 364/200 |
| 4,386,402 | 5/1983 | Toy | 364/200 |
| 4,398,248 | 8/1983 | Hsia et al. | 364/200 |

OTHER PUBLICATIONS

"Functional Interface Unit-HFIU1616iLBX", published by Honeywell Inc., 1150 E. Cheyenne Mountain Blvd., Colorado Springs, Colo., TM 1988.

*Primary Examiner*—Raulfe B. Zache
*Attorney, Agent, or Firm*—Haugen and Nikolai

[57] ABSTRACT

Microprocessor controlled apparatus for interconnecting at least two very high speed integrated circuit chips having digital inputs and outputs. Included are a local data bus, a microprocessor unit and its associated memory unit, and a plurality of functional interface units. One functional interface unit is connected between the microprocessor and the local bus. The remaining functional interface units are connected between the local bus and one of the integrated circuit chips so that all of the functional interface units are responsive to control commands from the processor and pass data from one integrated circuit chip to another. The circuit chips can be custom or can be customized via substrate interconnection. The data passes in through a functional interface unit from its associated chip and is put onto the local bus by the functional interface unit and transferred to at least one other functional interface unit which in turn passes the data to its associated integrated circuit chip as designated by the microprocessor which controls the flow of data within the interconnection apparatus.

4 Claims, 3 Drawing Sheets

MICROPROCESSOR CONTROLLED INTERCONNECTION APPARATUS FOR VERY HIGH SPEED INTEGRATED CIRCUITS

BACKGROUND OF THE INVENTION

I. Field of the Invention:

The invention is directed generally to the field of integrated circuit design, and more particularly to microprocessor controlled apparatus for interconnecting very high speed integrated circuits within multi-chip packages.

II. Discussion of the Prior Art:

Current design practices for designing and interconnecting custom integrated circuit chips typically result in a design with chips interconnected in a semiconductor material, which must communicate with each other, share data buses or other electrical connections directly. Such direct chip-to-chip linkages result in complex routing of signal lines within the chip as well as non-uniform and non-standard input/output requirements. Since known designs are approached on such a non-standard basis, partitioning of designs becomes difficult.

One area where interconnection of integrated circuits is extremely important is the multi-chip package implementation wherein several integrated circuits or "chips" are packaged together in functional blocks. Most known multi-chip package implementations use logic levels for communication between chips. Currently, very few multi-chip packages have been implemented into products because substrate processing technology and packaging have not progressed in density and performance sufficiently to allow a multi-chip package to be considered a functional entity. The multi-chip package presents a significant design problem in cost and complexity, although it is a significant advance in capability.

The invention provides a means for achieving a workable interconnection of integrated circuits, particularly very high speed integrated circuits, utilizing standard interface parts organized about a local data bus. The invention allows for standardization of input/output designs of custom integrated circuits and eliminates the need for designers to consider varying input/output requirements and logic levels in order to achieve interconnection of a plurality of integrated circuit chips in, for example, a multi-chip package. It achieves this by the combination of processor chips and software, standard interfaces and provides the logical interconnection of gates within a chip at the substrate level.

One known approach currently being utilized in multi-chip packaging implementations is shown in FIGS. 1 and 2. This known approach utilizes a functional interface unit 20 such as the Model No. HFIU1616iLBX functional interface unit as available from Honeywell Inc., 1150 East Cheyenne Mountain Blvd., Colorado Springs, Colo. The HFIU1626iLBX is a Functional Interface Unit (FIU) which provides complete protocol and hardware support for interfacing between the HBI-U1600ED Bus Interface Unit (BIU), also available from Honeywell Inc., and the iLBX-bus. The FIU is fully compliant with VHSIC Phase 2 in operability standards, PIbus Specification, version 2.1 as required by the Joint Integrated Avionics Working Group (JIAWG) Common Avionics Baseline (CAB) 1 Backplane Standard dated June 1, 1987. The Honeywell FIU handles PI-bus messages and data transfer between the PI-bus, via the FIU and the local bus processor. An internal block diagram of the FIU is shown in FIG. 1.

The basic elements included in the FIU include input/output transceivers 100, clock control 102, test and maintenance controller 104, bus access control 106, register file 108, sync logic 110, input/output transceivers 112, local bus interface 114, memory address generator and cycle controller 116, controller sequence 118 and control registers 120.

As shown in FIG. 2, the PI-bus has a linear, multidrop, synchronous bus that supports digital message communications between up to 32 modules residing on a single backplane. Messages are transferred datum serial and bit parallel using a datum size of 16 bits per single word or 32 bit per double word.

The prior art implementation includes a local bus 122, interfacing with an FIU 20, which in turn interfaces with a bus interface unit 34 and a test interface unit 124. Communication to the PI-buses 128 and 130, and the test maintenance bus 132 are accomplished through bus transceivers 126.

The PI-bus uses a master-slave communications protocol which allows the bus master to read data from one slave or write data to any number of slaves in a single message sequence. Messages may be routed to particular modules using either logical or physical addressing. A number of independent messages may be transmitted during a bus master's tenure. The message formats provide a 32-bit virtual address range for each module.

The FIU is also compatible with the VHSIC-standard Element Test and Maintenance (ETM) bus interface giving the user chip-level compatibility with other components supporting this standard. The ETM-bus interface monitors on-chip fault detectors and control serial scan, boundary scan, preset, self-test, and other design-for-test functions.

As shown in FIG. 2, the known art utilizes devices such as the FIU 20 to interface between local buses such as the PACE1750A and Motorola 68020 local bus interfaces as well as custom NiLBX buses and other buses such as the PI-bus and Test/Maintenance (TM) buses. As can be seen in FIG. 2, the prior art uses the FIU 20 merely as an interface between buses in connection with a BIU 34. This does not solve the problem of communications between all chips, including custom chips, which may be part of a multichip package. The invention now provides a means for using the FIU and local memory bus, or its equivalent, as a means for interconnecting chips within a multi-chip package so as to cause all major communications among chips within the package to be done on a data passing scheme instead of utilizing customized logic interface circuits for each application wherein one chip must communicate with another.

SUMMARY OF THE INVENTION

The invention comprises a microprocessor controlled apparatus for interconnecting at least two very high speed integrated circuit chips having digital inputs and outputs. Included are a local data bus, a processor unit and its associated memory unit, and a plurality of functional interface units and interfaces to interconnect logic on the chips. One functional interface unit is connected between the processor and the local bus. The remaining functional interface units are connected between the local bus and one of the integrated circuit chips so that all of the functional interface units are responsive to control commands from the processor and pass data from one integrated circuit chip to another. The data passes in through a functional interface unit from its associated chip and is put onto the local bus by the functional interface unit and transferred to at least one other functional interface unit which in turn passes the data to its associated integrated circuit chip as designated by the processor which controls the flow of data within the interconnection apparatus. This integrated circuit chip can be either a custom chip or a chip with logic circuits that are interconnected via substrate.

It is a primary object of the invention to provide an interconnection apparatus for very high speed integrated circuits in order to facilitate their assembly into a multi-chip package to customize the package function.

It is another object of the invention to provide an interface for integrated circuits which allows for standardization of input and output requirements for custom integrated circuits which must send and receive data to each other and to allow for customization of chips by interconnecting logic within chips via substrate.

Other objects, features and advantages of the invention will become apparent through the drawings herein wherein like numerals refer to like elements, and through the detailed description of the preferred embodiments and claims herein.

DESCRIPTION OF THE PREFERRED EMBODIMENTS

Figure 3:
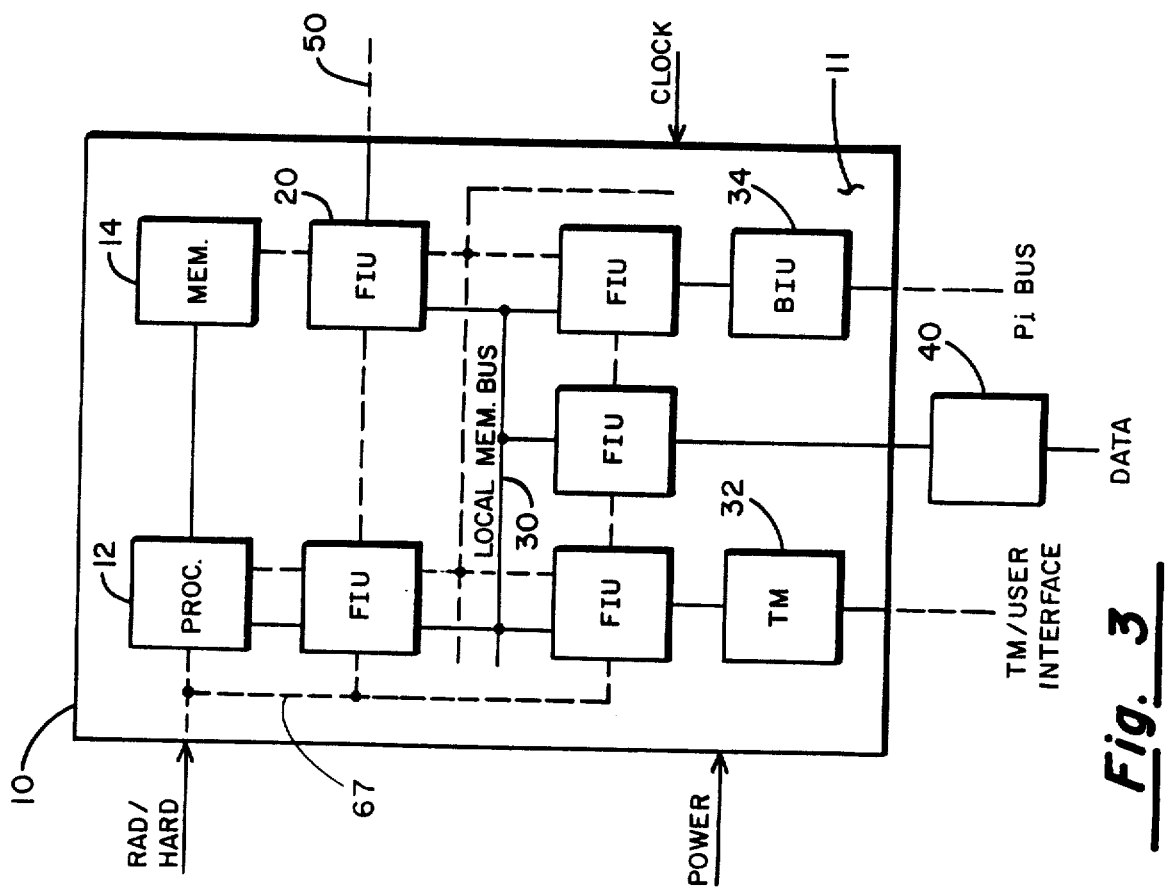
FIG. 3 shows a functional block diagram of one embodiment of the invention. 5

Referring now to FIG. 3, an example of one embodiment of the invention is shown in a functional block diagram form. The invention will be described with reference to FIG. 3 with the understanding that it is to serve as an example and those skilled in the art will recognize that the invention may be implemented in various equivalent forms similar to those shown in FIG. 3.

The interconnection apparatus 10 shown in FIG. 3 comprises a processor 12 with its associated memory unit 14, a plurality of FIUs 20 which are all connected at a first interface to a local memory bus 30. Each FIU 20 is connected at a second interface to one device such as a test and maintenance module 32, a bus interface unit 34, the processor 12 or a custom integrated circuit chip 40 as supplied by the user. Such custom chips may also be integral with the connection apparatus 10. The custom chips, memory unit, FIUs and other modules which comprise the interconnection apparatus 10 may all be mounted on a substrate 11. Substrate 11 may be comprised of a suitable material, such as ceramic or semiconductor material or equivalent materials and may be a multilayer substrate. The interface apparatus 10 may include radiation hardening control lines as shown by the broken lines 67 in FIG. 3. The interface unit 10 may also include a line shown as broken line 50, which may be partially embedded in substrate 11, for communicating with other interface modules which are constructed similarly to interface apparatus 10. In this way, the interface apparatus 10 may be replicated several times within a system to provide a means for interconnecting many and various types of integrated circuits.

Figures 1, 2:
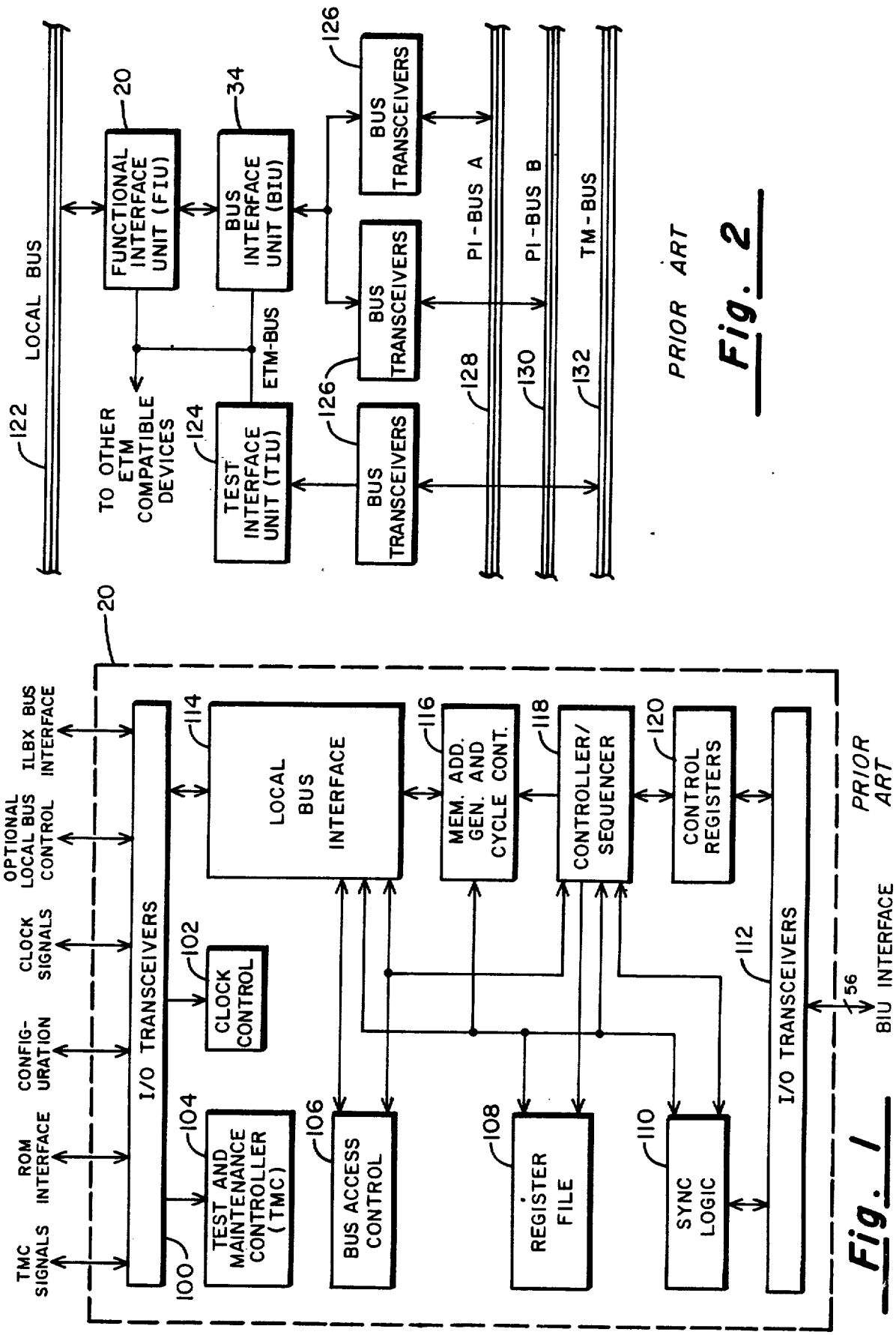
FIG. 1,/ shows a functional block diagram of a known functional interface unit (FIU).
FIG. 2 shows a functional block diagram of a known scheme for interfacing a plurality of data buses with a local bus associated with a microprocessor.
Figure 4:
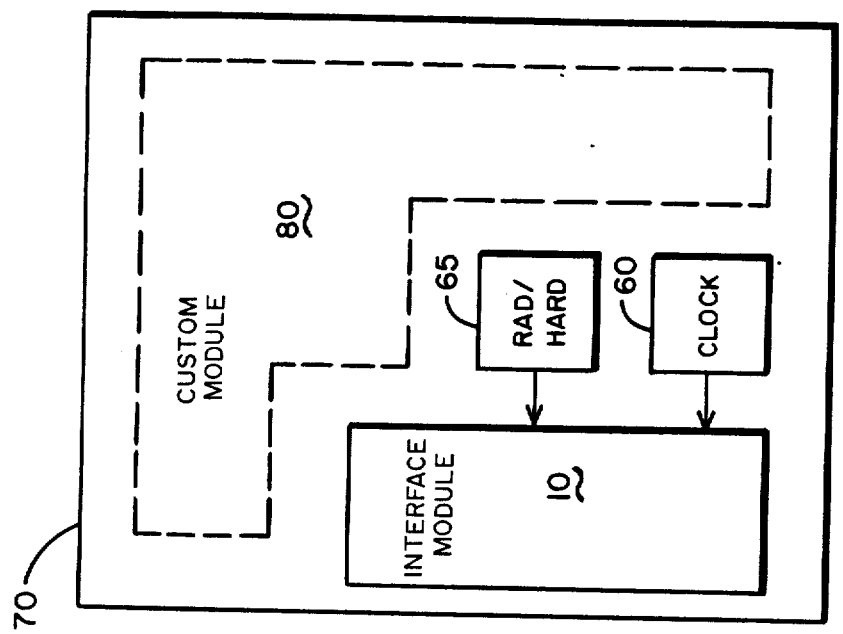
FIG. 4 shows an example of one application of the invention in a block diagram form.

FIG. 4 shows a block diagram of an interface module 10 with associated clock circuitry 60 and radiation hardening circuitry 65 used on a backplane 70 which also includes a custom module 80 which may include, for example, another processor, bulk memory, and other custom integrated circuitry which is interfaced through the interface module 10. The clock and radiation hardening circuitry may be any such applicable circuitry as is well known in the art.

Figure 5:
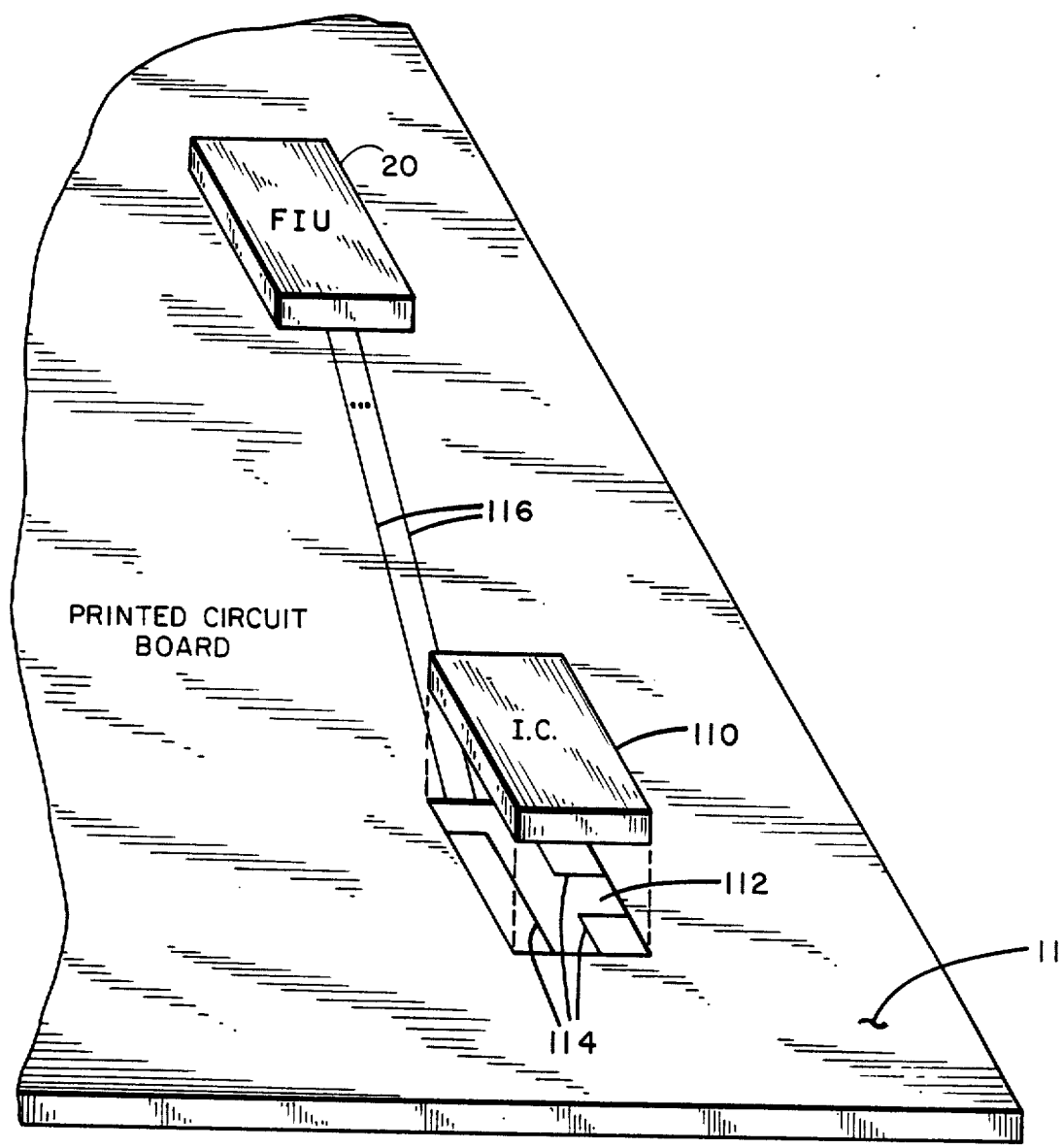
FIG. 5 illustrates an interconnect scheme for a standard semiconductor chip mounted at a substrate interconnect die site.

While FIGS. 3 and 4 show one example of an application of the invention as an interconnection apparatus including a test and maintenance module and a bus interface unit, it will be apparent to those skilled in the art that there are many other possible applications of the invention. For example, custom semiconductor chips may be substituted for the test and maintenance module or bus interface unit, both. In a further example, standard chips could be mounted on the substrate at the die site for such a standard chip to route logic signals in accordance with the application desired by the unit. An illustration of such an embodiment is shown in FIG. 5. Shown in FIG. 5 is a standard chip 110, substrate 11, and a custom routing interface at die site 112. Routing lines 114 are shown for illustrative purposes. The chip is connected to other devices on the substrate by a plurality of conductors 116. In this way, interconnections can be accomplished at the chip level on the substrate level or both, depending upon the application. In a typical embodiment, the input/output interconnects will be on board the standard chip, while application specific routing of the logic on the chip will be done on the substrate.

Having described the various elements and their relationship, we now turn to a discussion of the operational aspects of the invention. Referring again to FIG. 3, in operation data would be introduced into the interface module 10 through, for example, custom integrated circuit 40. The FIU associated with integrated circuit 40 would put a signal on the local memory bus 30 which would signal to the FIU associated with the processor that integrated circuit chip 40 was inputting data to the bus. The FIU associated with the processor would transfer this information to the processor which would in turn, through its FIU, control the information coming onto the bus from the FIU connected to chip 40. The data from 40 would then be routed in a similar manner to the designated receiving module by the processor to the FIUs. The receiving module could potentially be any or all of the other modules connected to any of the FIUs including the test/maintenance module, a BIU, the processor or another custom module or custom chip. In this way, communication from chip-to-chip flows through the respective FIUs and is controlled by the processor. The same process would be followed when using several modules like interface module 10 connected in, for example, a parallel processing system. In this way, the invention provides for uniform design of I/0 ports for all circuits in the system, thereby simplifying routing and I/0 requirements.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that there is modifications, both as to the equipment details and operating procedures, can be accomplished without departing from the scope of the invention itself.

What is claimed is:

1. Apparatus for interconnecting at least two very high speed integrated circuit chips in a multi-chip package having digital inputs and outputs comprising:
a local data bus;
a microprocessor;
a digital memory connected to the microprocessor;
a plurality of modular functional interface units wherein at least one of the modular functional interface units is connected between the local bus and the microprocessor and the other modular functional interface units are connected between the local bus and one of the integrated circuit chips, wherein all of the modular function interface units are responsive to control commands from the microprocessor so as to pass data from one integrated circuit chip to another by routing through a first connected functional interface unit to the local data bus and out through at least one other functional interface unit to its connected integrated circuit chip, and wherein the modular functional interface units are structured and arranged to provide uniform input/output ports for all of the interconnected integrated circuit chips so as to simplify routing and input/output requirements.

2. The apparatus of 1 further including at least one test and maintenance integrated circuit chip.

3. The apparatus of 1 further including at least one bus interface connected to one of the functional interface units compatible with PI-bus technology.

4. The apparatus of claim 3 further including means for customizing circuit chips by interconnects within the substrate.

* * * * *